US011233718B2

(12) United States Patent
Larson

(10) Patent No.: US 11,233,718 B2
(45) Date of Patent: Jan. 25, 2022

(54) PACKET PROCESSING FRAMEWORK

(71) Applicant: CIENA CORPORATION, Hanover, MD (US)

(72) Inventor: Michael David Larson, San Francisco, CA (US)

(73) Assignee: CIENA CORPORATION, Hanover, MD (US)

(*) Notice: Subject to any disclaimer, the term of this patent is extended or adjusted under 35 U.S.C. 154(b) by 200 days.

(21) Appl. No.: 15/338,087

(22) Filed: Oct. 28, 2016

(65) Prior Publication Data

US 2018/0097713 A1 Apr. 5, 2018

Related U.S. Application Data

(60) Provisional application No. 62/402,884, filed on Sep. 30, 2016.

(51) Int. Cl.
G06F 9/50 (2006.01)
G06F 13/00 (2006.01)
(Continued)

(52) U.S. Cl.
CPC ............ *H04L 43/0876* (2013.01); *G06F 9/50* (2013.01); *G06F 9/5027* (2013.01); *G06F 13/00* (2013.01); *H04L 41/142* (2013.01); *H04L 41/20* (2013.01)

(58) Field of Classification Search
CPC ..... H04L 43/0876; H04L 49/109; G06F 9/50; G06F 9/5057; G06F 13/00; G06T 1/20
See application file for complete search history.

(56) References Cited

U.S. PATENT DOCUMENTS 8,971,338 B2 * 3/2015 Mishra ................ H04L 49/00
370/401
2013/0176850 A1 7/2013 Mishra et al.
(Continued)

FOREIGN PATENT DOCUMENTS

WO 2018063786 A1 4/2018

OTHER PUBLICATIONS

Hardware, Software, and Solution for Embedded and IoT Developers, Retrieved from the internet Oct. 28, 2016 http://www.intel.com/content/www/us/en/embedded/embedded-design-center.html.
(Continued)

Primary Examiner — Emmanuel L Moise
Assistant Examiner — Xiang Yu
(74) Attorney, Agent, or Firm — Guntin & Gust, PLC; Mark Wilinski

(57) ABSTRACT

Techniques are disclosed for improved data routing and forwarding by exploiting the increasing number of logical cores in a computing system. In certain embodiments, a network device comprising several network interfaces and logical cores is disclosed. The network device may also include a plurality of processing nodes, wherein each processing node includes instructions for processing network packets and is associated with a logical core. Furthermore, the network device may include control logic configured to receive a network packet at an interface, select a subset of processing nodes from the plurality of processing nodes for processing the network packet, based on contents of the network packet and the interface that the network packet was received at, and schedule processing of the network packet by the subset of the processing nodes on the respective logical cores associated with each of the subset of the processing nodes.

20 Claims, 16 Drawing Sheets

(51) Int. Cl.
*H04L 12/24* (2006.01)
*H04L 12/26* (2006.01)

(56) References Cited

U.S. PATENT DOCUMENTS

| | | | |
|---|---|---|---|
| 2013/0283277 A1* | 10/2013 | Cai | G06F 1/329 |
| | | | 718/102 |
| 2017/0083316 A1* | 3/2017 | Burger | G06F 9/30058 |
| 2017/0103022 A1* | 4/2017 | Kreinin | G06F 12/0842 |
| 2017/0177221 A1* | 6/2017 | Trehan | H04L 67/322 |

OTHER PUBLICATIONS

Norbert Egi, et al., "Improved Forwarding Architecture and Resource Management for Multi-Core Software Routers," Network and Parallel Computing, 2009; NPC '09, Sixth IFIP International Conference ON, IEEE, Oct. 19, 2009 (pp. 117-124).

Sangjin Han, et al., "PacketShader," Computer Communication Review, ACM, vol. 40, No. 4, Aug. 30, 2010 (pp. 195-206).

International Application No. PCT/US2017/051006, International Search Report dated Jun. 12, 2017 (4 pages).

PCT/US2017/051006, "International Preliminary Report on Patentability", datd Apr. 11, 2019, 9 pages.

Office Action for Canadian Patent Application No. CA 3,036,226, dated Mar. 11, 2020, 4 pages.

* cited by examiner

Node module registration

```
enum ipv4_fw_in_dispositions {
    IPV4_FW_ACCEPT,
    IPV4_FW_TO_V6,
    IPV4_FW_DROP,
    IPV4_FW_NUM
};

/* Register Node */
PL_REGISTER_NODE (ipv4_fw_in_node) = {
    .name = "ipv4-fw-in",
    .domain = "vyatta",
    .type = PL_PROC,
    .handler = ipv4_fw_in_process,
    .num_next = IPV4_FW_NUM,
    .next = {
        [IPV4_FW_ACCEPT] = "ipv4-rt1",
        [IPV4_FW_TO_V6] = "ipv6-input",
        [IPV4_FW_DROP] = "packet-drop"
    }
};
```

FIG. 8

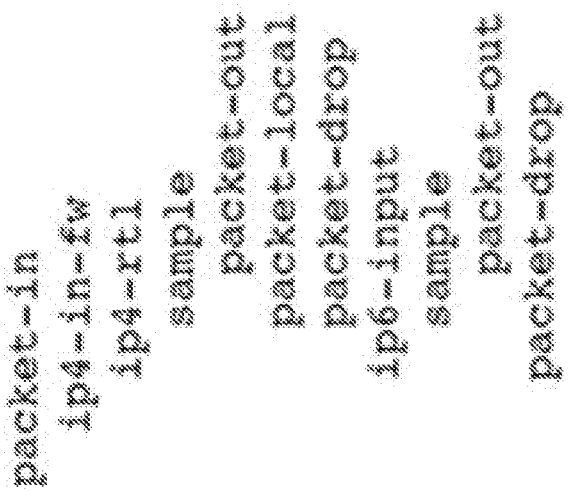
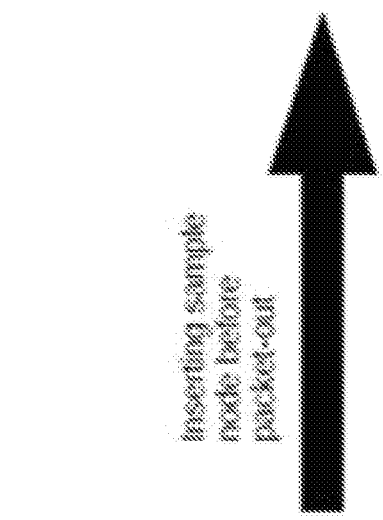
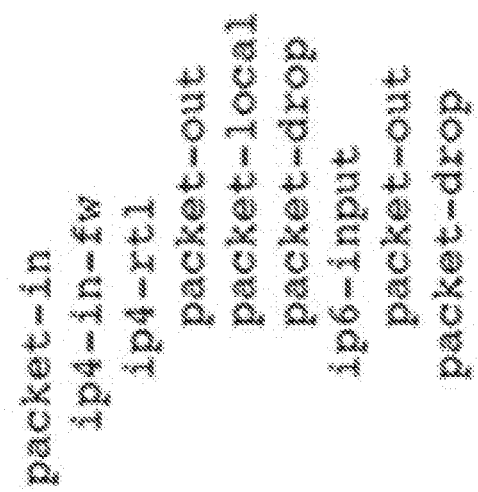
FIG. 9

```
PL_REGISTER_STORAGE (npf) = {
    .id = NPF_STORAGE,
    .release = npf_data_cleanup,
};

int
pl_get_node_data(pl_packet_t *, uint8_t, void**);

void
pl_set_node_data(pl_packet_t *, uint8_t, void*);
```

FIG. 10

```
PL_REGISTER_CMD (fw_set) = {
    .cmd = "fw_set",
    ._handler = cmd_npf_fw_set,
};

PL_REGISTER_CMD (fw_list_sessions_nat) = {
    .cmd = "fw_list_sessions_nat",
    ._handler = cmd_npf_walk_sessions_nat,
};
```

FIG. 11

CLI node configuration

```
system {
    node {
        [node-name] {
            match [match-group] {
                disable
            }
        }
    }
}
```

FIG. 12

Node processing example (firewall)

```
while (running) {
    zlist_t *coll = pl_q_batch_get(g_node);
    if (!coll)
        continue;

/* iterate through packets */
    pl_packet_t *pkt = zlist_first(coll);
    do {
        /* Application/node logic below */
        uint16_t *npf_flags;

struct rte_mbuf *m = pl_get_mbuf(pkt);
        struct ifnet *ifp = pl_get_input_iface(pkt);

if (!!pl_get_node_data(pkt, NPF_STORAGE, (void**)&npf_flags)) {
            pl_set_disposition(pkt, IPV4_FW_ACCEPT);
            continue;
        } if (!*npf_flags)
            npf_flags = calloc(sizeof(uint16_t), 1);

npf_conf_t *fw_conf = rcu_dereference(ifp->if_zone);
        if (!npf_is_active(fw_conf))
            fw_conf = rcu_dereference(npf_fw_conf);

/* what is the best way to define app specific data? */
        bool fw_active = npf_is_active(fw_conf);

if (fw_active) {
            npf_result_t result =
                npf_hook_track(fw_conf, m, ifp, PFIL_IN, *npf_flags);

pl_set_node_data(pkt, NPF_STORAGE, npf_flags);
            if (result.decision != NPF_DECISION_PASS)
                pl_packet_push(g_node, IPV4_FW_DROP, pkt);
            else if (result.action == NPF_ACTION_TO_V6)
                pl_packet_push(g_node, IPV4_FW_TO_V6, pkt);
            else
                pl_packet_push(g_node, IPV4_FW_ACCEPT, pkt);
        }
    } while ((pkt = zlist_next(coll)));
}
```

FIG. 13

Node op commands (example)

```
# show node counters
   Count           Node           Reason
     2             ip6-input      ip6 destination lookup miss
    26             ip4-input      ip4 destination lookup miss
     1             ip4-arp        ARP requests sent
   348             llc-input      unknown llc ssap/dsap
     2             arp-input      ARP replies sent
     1             arp-input      ARP replies received show run
Time 633.7, average vectors/node 1.46, last 128 main loops 0.00 per node 0.00
vector rates in 1.0388e0, out 1.7358e-2, drop 1.0730e0, punt 0.000e0
    Name           State      Calls    Packets    Clocks
ip4-arp            active       1          1      8.45e4
ip4-input          active      41         53      3.80e3
ip4-lookup         active      39         51      2.44e3
```

FIG. 14

Node trace capabilities (example)

```
# show trace

Packet 1

00:18:39:990843: dpdk-input
  dp0s0s1 rx queue 0
  buffer 0x1503b: current data 0, length 98, free-list 0, totlen-nifb 0, trace 0x0
  PKT MBUF: port 0, nb_segs 1, pkt_len 98
    buf_len 2176, data_len 98, ol_flags 0x0,
    packet_type 0x0
  IP4: 52:54:00:39:f9:54 -> 52:54:00:51:d0:6c
  ICMP: 10.0.1.102 -> 10.0.2.102
    tos 0x00, ttl 64, length 84, checksum 0x22de
    fragment id 0x0000, flags DONT_FRAGMENT
  ICMP echo_request checksum 0x3d9a
00:18:39:990871: ethernet-input
  IP4: 52:54:00:39:f9:54 -> 52:54:00:51:d0:6c

...

00:18:39:990887: GigabitEthernet0/5/0-tx
  dp0s0s2 tx queue 0
  buffer 0x1503b: current data 0, length 98, free-list 0, totlen-nifb 0, trace 0x0
  IP4: 52:54:00:11:bd:3a -> 52:54:00:75:73:7d
  ICMP: 10.0.1.102 -> 10.0.2.102
    tos 0x00, ttl 63, length 84, checksum 0x23de
    fragment id 0x0000, flags DONT_FRAGMENT
  ICMP echo_request checksum 0x3d9a
```

FIG. 15

PACKET PROCESSING FRAMEWORK

CROSS-REFERENCES TO RELATED APPLICATIONS

This patent application claims priority to U.S. Provisional Patent Application Ser. No. 62/402,884, filed Sep. 30, 2016, entitled "PACKET PROCESSING FRAMEWORK," the content of which is incorporated herein by reference in its entirety for all purposes.

BACKGROUND OF THE INVENTION

Present disclosure generally relates to data routing and forwarding, and more specifically to a networking architecture for exploiting the increasing number of logical cores in a computing system.

Generally, processors and more specifically, central processing units (CPU) or general purpose (GP) processors have experienced an explosion in the number of logical cores enabled on each physical processor. For, example, certain GP processors may support anywhere from 2 logical cores to 32 and more logical cores.

In certain embodiments, a computing system may have multiple physical processors. The number of physical processors are typically anywhere from 1 to 4 physical processors, but can be more. In certain embodiments, each physical processor may have multiple physical cores (also referred to as physical processing entities). This can be anywhere from 1 to 8, but can be significantly more as manufacturing capabilities are improving drastically. In certain implementations, multiple physical cores on the same physical processor share physical resources, such as last level caches.

In certain implementations, each physical core may be further configured to expose a plurality of logical cores (or logical processing entities) to the software layer by sharing various processing resources of the physical core, such as several stages of the processor pipeline, lower level caches, buffers, etc. For example, on certain processors, Intel® enables two logical cores per physical core using Hyper-Threading® and IBM® can enable 8 logical cores per physical core. Each logical core provide a software abstraction of a single standalone processor.

Logical cores run within physical cores, and physical cores run within physical processors. In instances where the processors do not support exposing of multiple logical cores using a single physical core or are disabled to do so, each physical core may also be referred to as a logical core. Furthermore, multiple software threads (also referred to as lthreads) can run on a single logical core.

As referred to in this disclosure, logical cores may refer to the number of logical processing entities exposed by a physical processor to the software executing on the physical processor and it may include both logical and physical cores. For example, a computing system comprising two processor sockets with two physical processors, each physical processor comprising 8 physical cores and each physical core comprising 2 logical cores may expose 32 logical cores to software executing on the system.

Current networking architecture is not configured to exploit the exponentially increasing number of logical cores in a system and instead executes the network pipeline as a rigid monolithic pipeline resulting in several inefficiencies.

BRIEF SUMMARY

Present disclosure generally relates to data routing and forwarding, and more specifically to a networking architecture for exploiting the increasing number of logical cores in a computing system.

Current networking architecture is not configured to exploit the exponentially increasing number of logical cores in a system and instead executes the network pipeline as a rigid monolithic pipeline resulting in several inefficiencies. In certain implementations, each packet sequentially traverses each network pipeline stage regardless of the type of processing needed for the network packet and if all the pipeline stages process the network packets. Aspects of the disclosure provide techniques for more efficiently utilizing the resources available in a multi-core environment.

Certain embodiments are disclosed for improving utilization of the resources available on a multi-core system using a processing framework. Various functional components of a conventional network device are segmented into processing nodes. The processing framework associates each processing node with a logical core from the multi-core system and maintains a pool of processing nodes. The processing framework defines various packet arcs (or network paths), wherein each packet arc includes a sequence of processing nodes for processing a particular network packet. Upon receiving a network packet, based on the network packet an appropriate packet arc and consequently the appropriate processing nodes are selected for processing the network packet.

Therefore, as described herein, the network pipeline is dynamically assembled upon receiving the network packet using processing nodes from the pool of processing nodes. As soon as the network packet is processed the processing nodes may continue processing other queued network packets. Such a system allows the same logical processing block (i.e., processing node) to be dynamically used by multiple dynamic pipelines in the processing of multiple packets and returned to the pool of processing nodes upon completion of processing of the network packets. Furthermore, the processing framework allows for differentiation between network packets and allows the network packets to follow radically different packet arcs or paths again resulting in significantly more efficient use of processing resources.

An example network may include a plurality of network interfaces for receiving network packets, a plurality of logical cores, and a plurality of processing nodes, wherein each processing node from the plurality of processing nodes includes instructions for processing network packets and is associated with one of the plurality of logical cores for execution on a respective one of the plurality of logical cores. The example network device may further include control logic configured to receive a network packet at an interface from the plurality of interfaces, select a subset of processing nodes from the plurality of processing nodes for processing the network packet, based on contents of the network packet and the interface that the network packet was received on, wherein the subset of processing nodes is less than the plurality of processing nodes, and schedule processing of the network packet by the subset of the processing nodes on the respective logical cores associated with each of the subset of the processing nodes.

In certain embodiments, the network device may further include a processing framework, prior to receiving the network packet, configured to initialize the plurality of processing nodes based on a number of the plurality of logical cores, and determine a packet arc, wherein the packet arc is a sequence of subset of processing nodes from the plurality of processing nodes for processing network packets, wherein selecting the subset of the processing nodes from the plurality of processing nodes is performed by selecting the packet arc.

In certain embodiments, each of the plurality of the processing nodes may execute using a software thread and each of the software thread may be associated with the logical core by setting affinity of the software thread to the respective logical core. In certain embodiments, the subset of processing nodes from the plurality of processing nodes for processing of the network packet based on information received from a network control plane. The processing node from the plurality of processing nodes may be configured to process the network packet based on instructions received from a network control plane. In certain embodiments, a processing node from the plurality of processing nodes at the time of processing of the network packet changes the subset of processing nodes from the plurality of processing nodes for processing of the network packet. In certain embodiments, a processing node from the plurality of processing node changes the sequence of the processing to be performed by the set of processing nodes on the network packet. In certain embodiments, each of the processing nodes comprises an input queue for receiving network packets from a previous processing node and an output queue for sending network packets.

In certain embodiments, the processing framework may be further configured to add a new processing node to the plurality of processing nodes and add the new processing node for processing of the network packet in a sequence of processing nodes comprising a first processing node and a second processing node in sequence to each other in the subset of processing nodes, by redirecting output of the first processing node to the new processing node and directing the output of the new processing node to the second processing node. In certain embodiments, the control logic is further configured to remove a processing node from the plurality of processing nodes for processing of the network packets. In certain embodiments, the control logic is further configured to replace an existing processing node from the plurality of processing nodes with a new processing node for processing of the network packets.

In certain embodiments, the plurality of processing nodes are each configured to collect statistics based on processing of the network packet, wherein the processing nodes and the logical cores scheduled for processing network packets are changed based on the collected statistics from one or more processing nodes. In certain embodiments, the network packet is processed using multiple processing nodes from the subset of processing nodes on a plurality of processor cores concurrently.

An example method for processing network packets may include determining a number of logical cores in a network device, initializing a plurality of processing nodes based on the number of logical cores, wherein each processing node from the plurality of processing nodes includes instructions for processing network packets, associating each of the plurality of processing nodes with a logical core from the plurality of logical cores, such that the instructions for a processing node from the plurality of processing nodes is executed on an associated logical core with the processing node, determining a packet arc, wherein each packet arc is a sequence of subset of processing nodes from the plurality of processing nodes for processing network packets, receiving a network packet at a network interface of the network device, selecting a packet arc, based on contents of the network packet and the network interface that the network packet was received at, and processing the network packet using processing nodes from the selected packet arc, wherein the instructions for the processing nodes are executed on the associated logical cores.

In certain embodiments, each of the plurality of the processing nodes executes using a software thread and each of the software threads is associated with a logical core by setting affinity of the software thread to the respective logical core. In certain embodiments, the method further includes adding a new processing node to the plurality of processing nodes and adding the new processing node for processing of the network packet to the selected packet arc, wherein the selected packet arc comprises a first processing node and a second processing node in sequence to each other, by redirecting output of the first processing node to the new processing node and directing the output of the new processing node to the second processing node.

In certain embodiments, the plurality of processing nodes are each configured to collect statistics based on processing of the network packet, wherein the processing nodes and the logical cores scheduled for processing network packets are changed based on the collected statistics. In certain embodiments, each of the processing nodes may include an input queue for receiving network packets from a previous processing node and an output queue for sending network packets.

An example non-transitory computer-readable storage medium including machine-readable instructions stored thereon for determining a number of logical cores in a network device, initializing a plurality of processing nodes based on the number of logical cores, wherein each processing node from the plurality of processing nodes includes instructions for processing network packets, associating each of the plurality of processing nodes with a logical core from the plurality of logical cores, such that the instructions for a processing node from the plurality of processing nodes is executed on an associated logical core with the processing node, determining a packet arc, wherein each packet arc is a sequence of subset of processing nodes from the plurality of processing nodes for processing network packets, receiving a network packet at a network interface of the network device, selecting a packet arc from the plurality of arcs, based on contents of the network packet and the network interface that the network packet was received at, and processing the network packet using processing nodes from the selected packet arc from the plurality of processing nodes, wherein the instructions for the processing nodes are executed on the associated logical cores. In certain embodiments, the plurality of processing nodes are each configured to collect statistics based on processing of the network packet, wherein the processing nodes and the logical cores scheduled for processing network packets are changed based on the collected statistics.

BRIEF DESCRIPTION OF THE DRAWINGS

FIG. 8 illustrates an example processing node definition, according certain embodiments of the invention.

FIG. 9 illustrates a packet arc that can be dynamically updated with an unreferenced processing node, according to certain embodiments.

FIG. 10 illustrates example code for providing persistent packet storage, according to certain embodiments.

FIG. 11 illustrates example code for node command registration, according to certain embodiments.

FIG. 12 illustrates example code for command line interface (CLI) node configuration, according to certain embodiments.

FIG. 13 illustrates example code for a processing node, such as a firewall, according to certain embodiments.

FIG. 14 illustrates example statistics associated with a processing node, according to certain embodiments.

FIG. 15 illustrates example processing node trace capabilities, according to certain embodiments.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Current networking architecture is not configured to exploit the exponentially increasing number of logical cores in a system and instead executes the network pipeline as a rigid monolithic pipeline resulting in several inefficiencies. In certain implementations, each packet sequentially traverses each network pipeline stage regardless if the network packet is operated on in that particular network pipeline stage. Aspects of the disclosure provide techniques for more efficiently utilizing the resources available in a multi-core environment.

Figure 1:
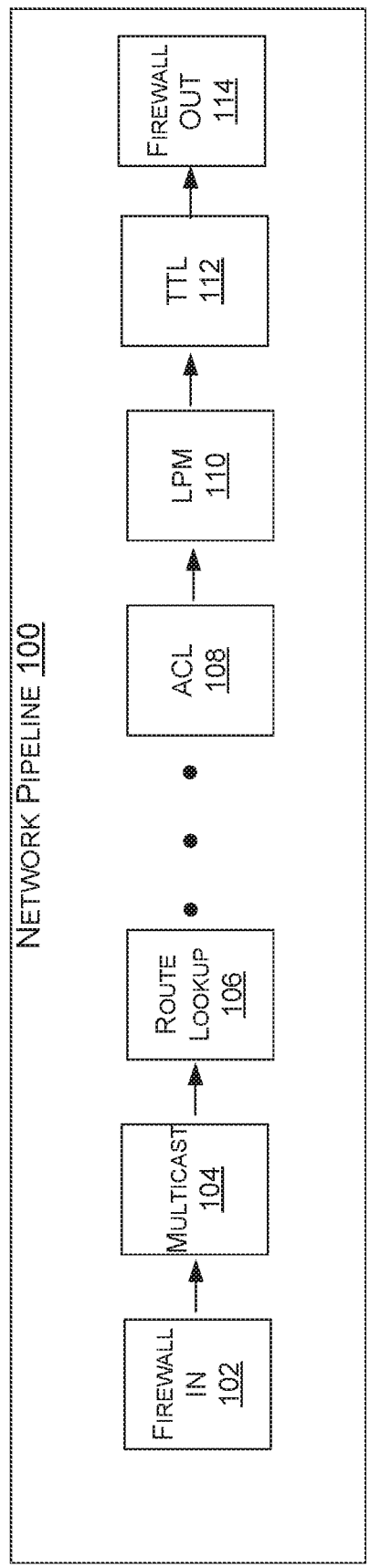
FIG. 1 is a block diagram that illustrates a few different examples and non-limiting functional components for a network pipeline for processing network packets.

FIG. 1 is a block diagram that illustrates a few different example and non-limiting functional components for a network pipeline for processing network packets. For example, the functional components for processing network packets disclosed in FIG. 1 may include firewall in 102, multicasting 104, route lookup 106, access control list (ACL) 108, longest prefix match (LPM) 110, time to live (TTL) 112, firewall out 114, etc. As illustrated in FIG. 1, the network pipeline may have several pipeline stages, each pipeline stage having a certain width. Generally, each functional component may be processed during a single pipeline stage. However, for functions taking longer periods of time, the functional component may be split into a number of sub-functions such that the functional component can be performed in a number of pipeline stages. Several factors may determine the number of pipeline stages and the width associated with each pipeline stage. For example, the critical path of the longest functional component (or sub-function) may dictate the width of the network pipeline stage.

In certain implementations, regardless of processing required for a network packet, the network packet must traverse through each of the network pipeline stages, therefore resulting in inefficient use of resources. For example, some functional components may require significantly more processing resources than other functional components. For instance, firewall or load balancing functions may require more resources, where as other functional components may require barely any processing resources (e.g., checking the packet headers for certain conditions). Furthermore, the processing resources for each stage are preconfigured and inflexible. This inefficient use of resources is exasperated, as the number of network interfaces for a network device increase, since in many instances a network pipeline is created to handle network packets arriving on each network interface.

In network devices, even in software environments, current techniques and libraries (e.g., data plane development kit (DPDK)) do not provide control over the resource allocation for a functional component based on processing and memory resources needed for each of the example functional components disclosed in FIG. 1. The above disparity in the processing needs for the functional components and the resources available for the processing may result in inefficient use of processing resources.

Certain embodiments are disclosed for improving utilization of the resources available on a multi-core system using a processing framework. Various functional components of a conventional network device are segmented into processing nodes. The processing framework associates each processing node with a logical core from the multi-core system and maintains a pool of processing nodes. The processing framework defines various packet arcs (or network paths), wherein each packet arc includes a sequence of processing nodes for processing a particular network packet. Upon receiving a network packet, based on the network packet an appropriate packet arc and consequently the appropriate processing nodes associated with the packet arc are selected for processing the network packet.

Therefore, as described herein, a network pipeline is dynamically assembled upon receiving a network packet using processing nodes from a pool of processing nodes. As soon as a network packet is processed the processing nodes may continue processing other queued network packets. Such a system allows the same logical processing block (i.e., processing node) to be dynamically used by multiple dynamic pipelines in processing of multiple packets and returned to the pool of processing nodes upon completion of processing of network packets. Furthermore, the processing framework allows for differentiation between network packets and allows the network packets to follow radically different packet arcs or paths again resulting in significantly more efficient use of processing resources.

Figure 2:
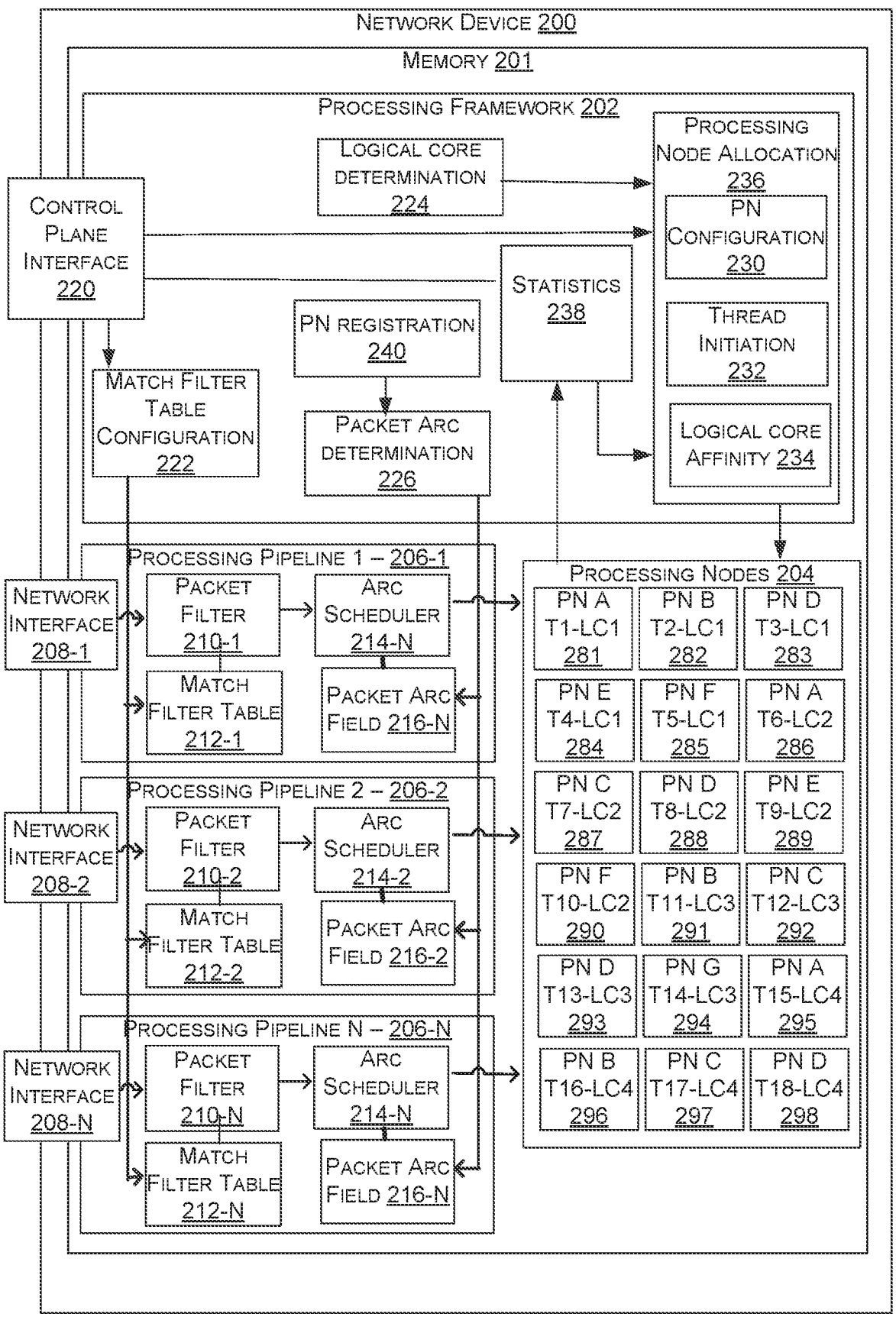
FIG. 2 is an example block diagram of an illustrative network device, according to certain embodiments of the invention.

FIG. 2 is an example block diagram of an illustrative network device, according to certain embodiments of the invention. The embodiment depicted in FIG. 2 is merely an example and is not intended to unduly limit the claimed embodiments of the present invention. One of ordinary skill in the art would recognize many variations, alternatives, and modifications. For example, in some other embodiments, the network device 200 may have more or fewer components than shown in FIG. 2, may combine two or more components, or may have a different configuration or arrangement of components. In certain implementations, FIG. 2 may employ one or more components disclosed in FIG. 16.

FIG. 2 illustrates components of a network device comprising a plurality of logical cores (not shown), memory 201 and network interfaces 208 (collectively referring to 208-1, 208-2 and 208-N). In certain embodiments, the network device is configured to execute a data plane subsystem for forwarding network packets. In certain embodiments, the network device may receive network control packets from a control plane subsystem for configuring the network device and controlling forwarding of the network packets on the network device. In yet other devices, the control plane may be co-located on the same device (i.e., device 200) as the data plane subsystem.

In certain embodiments, the network device 200 may be a multi-core system with several logical cores exposed to the software executing on the network device 200. One or more cores from the logical cores may be configured to load a processing framework 202 into memory 201 for managing the dynamic and flexible network pipeline. As discussed below, prior to processing of network packets for forwarding, the processing framework 202 may configure the network device by determining a number of logical cores in the system, generating a pool of processing nodes for processing of the network packets, determining of the various network paths for processing of network packets and configuration of various tables.

A logical core determination module 224 of the processing framework 202 may determine the number of logical cores available for performing network packet processing and forwarding. In certain embodiments, the logical core determination module 224 may use operating system application programming interface (API) for determining the number of logical cores available for network packet processing.

A processing arc determination module 226 may determine a number of different packet arcs for processing the network packets for the network device. A packet arc defines the path of processing of a network packet using a sequence of processing nodes at the network device. The packet arcs may be determined based on configuration information received from the control plane and programmed by a network administrator. In certain embodiments, a customized set of packet arcs may be determined for each network interface. Therefore, the network packets arriving at different network interfaces of the network device may be processed differently. In certain embodiments, the processing arc determination module 226 may program the packet arc field 216 (collectively referring to 216-1, 216-2 and 216-N) for each network interface 208.

In certain embodiments, a processing node allocation module 236 may allocate processing nodes. A PN configuration module 230 may configure the processing nodes based on the number of available logical cores (determined by the logical core determination module 224) and/or the configuration of the packet arcs (determined by the packet arc determination module 226). For example, if the packet arc determination module 226 has defined more packet arcs with a particular processing node, such as the firewall-in processing node, based on the availability of the logical cores, the PN configuration module 236 may configure more of firewall-in processing nodes. Therefore, the PN configuration module 236 starts the process of configuring different types of processing nodes and the number of each type of processing node. For example, the PN configuration module 236 may configure 4 firewall processing nodes, 5 route lookup processing nodes, 2 TTL processing nodes, etc. Example definition of a processing node is described in further detail with respect to FIG. 3.

A thread initiation module 232 of the processor node allocator 236 may initiate a software thread for each processing node. In certain embodiments, a software thread is a sequence of instructions that can be managed independently by an operating system scheduler.

In certain embodiments, the processing framework 202 or portions of the processing framework 202, such as the processing node configuration module 236 may be implemented in user space. In certain implementations, memory 201 may be logically partitioned into several regions, including kernel space and user space. Instructions loaded from kernel space, when loaded on the one or more logical cores may execute in kernel mode. Similarly, instructions loaded from the user space when loaded on the one or more logical cores may execute in the user mode. Instructions executing from the kernel space in kernel mode may in some instances have higher privilege and may be able to execute privileged instructions in comparison to user space instructions executing in user mode. In certain implementations, the thread initiation module 232 initiates software threads in user space. Software threads initiated in user space may be assigned different priorities, such as real-time priority. In certain implementations, the thread initiation module 232 may initialize the software threads as real-time threads allowing resource prioritization for processing of the network packets by the associated processing node.

Furthermore, the logical core affinity module 234 assigns each software thread a logical core affinity, such that the software thread associated with a particular processing node executes only on a pre-determined logical core. Several operating systems allow assigning a user space real-time software thread a processor affinity. As will be described in figures later, the affinity of software threads (running processing nodes) may be assigned to logical cores based on several considerations to improve the overall packet processing of the network packets. For example, several processing nodes processing a network packet in sequence may benefit from executing sequentially on the same logical core, since this may avoid copying the network packet and other state such as forwarding tables from the caches of one logical core to another.

As illustrated in FIG. 2, the processor node allocator module 236 generates a pool of processing nodes 204 prior to receiving network packets. This pool of processing nodes 204 is highly customized and directed based on the number of logical cores available, composition of the packets arcs and the affinity for each processing node/thread may be set to the respective logical core to further enhance the processing of the network packets.

As illustrated in FIG. 2, the example pool of processing nodes 204 includes 18 processing nodes that are scheduled for execution on four logical cores (i.e., LC1, LC2, LC3 and LC4). Processing node A is scheduled to execute on LC1 (281), LC2 (286) and LC4 (295). Processing node B is scheduled to execute on LC1 (282), LC3 (291) and LC4 (296). Processing node C is scheduled to execute on LC2 (287), LC3 (292) and LC4 (297). Processing node D is scheduled to execute on LC1 (283), LC2 (288), LC3 (293), and LC4 (298). Processing node E is scheduled to execute on LC1 (284) and LC2 (289). Processing node F is scheduled to execute on LC1 (285) and LC2 (290). Processing node G is schedule to execute on LC3 (294). As shown in the example pool of processing nodes 204, the processing framework 202 may configure different number of processing nodes for different functions.

The network device 200 may have tens or even hundreds of network interfaces 218 for receiving and transmitting network packets. The network device 200 may be configured to process network packets received at each of the network interfaces 208 and perform one or more operations on each of the network packets. According to certain embodiments of the invention, as network packets are received the network device 200 may be configured to form dynamic network pipelines 206 (collectively referring to 206-1, 206-2 and 206-N) based on the contents of the network packet and the interface the packet is received at.

Upon receiving of a network packet, a packet filter module 210 (collectively referring to 210-1, 210-2 and 210-N) may determine the appropriate packet arc for the network packet using the arc scheduler module 214 (collectively referring to 214-1, 214-2 and 214-N) and the packet arc field 216 (collectively referring to 216-1, 216-2 and 216-N). The packet filter module 210 may use match filter table 212 (collectively referring to 212-1, 212-2 and 212-N) in filtering of the network packets. The match filter table 212 may be configured by match filter table configuration module 222 of the processing framework 202 prior to receiving network packets, but may also be updated after network packets are received by the network device 200. In certain embodiments, the match filter table configuration module 222 may also receive instructions from a control plane via the control plane interface 220 that the match filter table configuration module 222 may use in updating the match filter tables 212.

In certain embodiments, the packet filter module 210 and the match filter table 212 may be implemented using one of the processing nodes configured by the processing framework 202. In certain embodiments, the match filter table configuration module 222 may configure the match filter table 212 with a set of ordered match rules that allow disabling of certain processing nodes in the selected packet arc. Following are two example rules for disabling certain processing nodes.

match src address 10.0.0.1 disable input-firewall
    match dest port 1999 disable policy-based-routing The first rule matches on the source address of 10.0.0.1 of the received network packet and disables the input-firewall for any matched packet. The second rule matches on the destination port of 1999 and disables policy-based-routing for any such matched network packet.

In certain embodiments, the packet arc field 216 may be configured by the packet arc determination module 226 with different packet arcs for different network packets. An example of the packet arc field is described in FIG. 4. In certain embodiments, the arc scheduler module 214 may select a packet arc from the packet arc field based on input from the packet filter module 210 and schedule the corresponding processing nodes associated with the selected packet arc from the pool of processing nodes 204 for processing of the network packets.

As will be described further with respect to FIG. 3, each of the processing nodes may also maintain statistics information. In certain embodiments, the statistics module 238 may receive statistics from the processing nodes. The statistics module 238 may process the received statistics from the processing nodes for determining the current performance bottlenecks in the system and system inefficiencies. For example, if the timestamps and other counters associated with processing node G indicate that additional processing nodes G are needed in the system (since the current system has only one processing node G) and that processing nodes D are not being fully utilized, the statistics module 238 may direct the processing node allocator module 236 to swap the physical resources for the processing node G and processing node D, such that the network device 200 has two processing nodes G and three processing nodes D, instead of one processing node G and four processing nodes D. In certain embodiments, the packet filter module 210, the match filter table 212, the arc scheduler module 214 and the packet arc field 216 may be referred to as control logic for setting up the dynamic network pipeline.

A PN registration module 240 may allow for adding, removing or replacing certain processing nodes from the pool of processing nodes 204. The PN registration module 240 allows flexibility in changing the behavior of the networking pipeline without recompiling the software image. For example, a network function performed by a processing node may be enhanced, replaced, or deleted after deployment of the network device 200. In certain embodiments, this also allows third party vendors or operators to further alter the functioning of the network device based on their needs. In certain embodiments, the new processing node may be provided to the PN registration module 240 with the relative position of the new processing node in the packet arc. For example, the PN registration module 240 may be informed that a new processing node is to follow all instances of the processing node D. The registration module 240 updates the pool of processing nodes via the processing node allocator module 236 and may also update the packet arc field 216, such that the network packets received utilize the modified packet arc with the new processing node.

In certain embodiments, the processing framework 202 can alter the behavior of the current processing nodes. The processing framework 202 may receive instructions from the control plane via the control plane interface 220 to modify the behavior of one or more current processing nodes. For example, the control plane may direct the processing framework 202 via the processing node allocator module 236 to disable a certain processing node altogether or it may direct the processing framework 202 to cause a certain processing node, such as an ACL processing node to drop all packets arriving from a particular source address.

As described above, the processing framework 202 along with the pool of specialized processing nodes 204 and the dynamic packet arc (in the packet arc field 216) that define the different dynamic processing pipelines provide a dynamic, flexible, and efficient system for processing networks. Furthermore, using statistics at a processing node granularity, this processing framework 202 can react to unexpected congestion in the network by dynamically adjusting the resources for any given network function exercised by any specific processing node. Moreover, this processing framework 202 also allows the flexibility to enhance, replace, or remove certain networking functionality and therefore provides an extendible processing framework for a network device.

Figure 3:
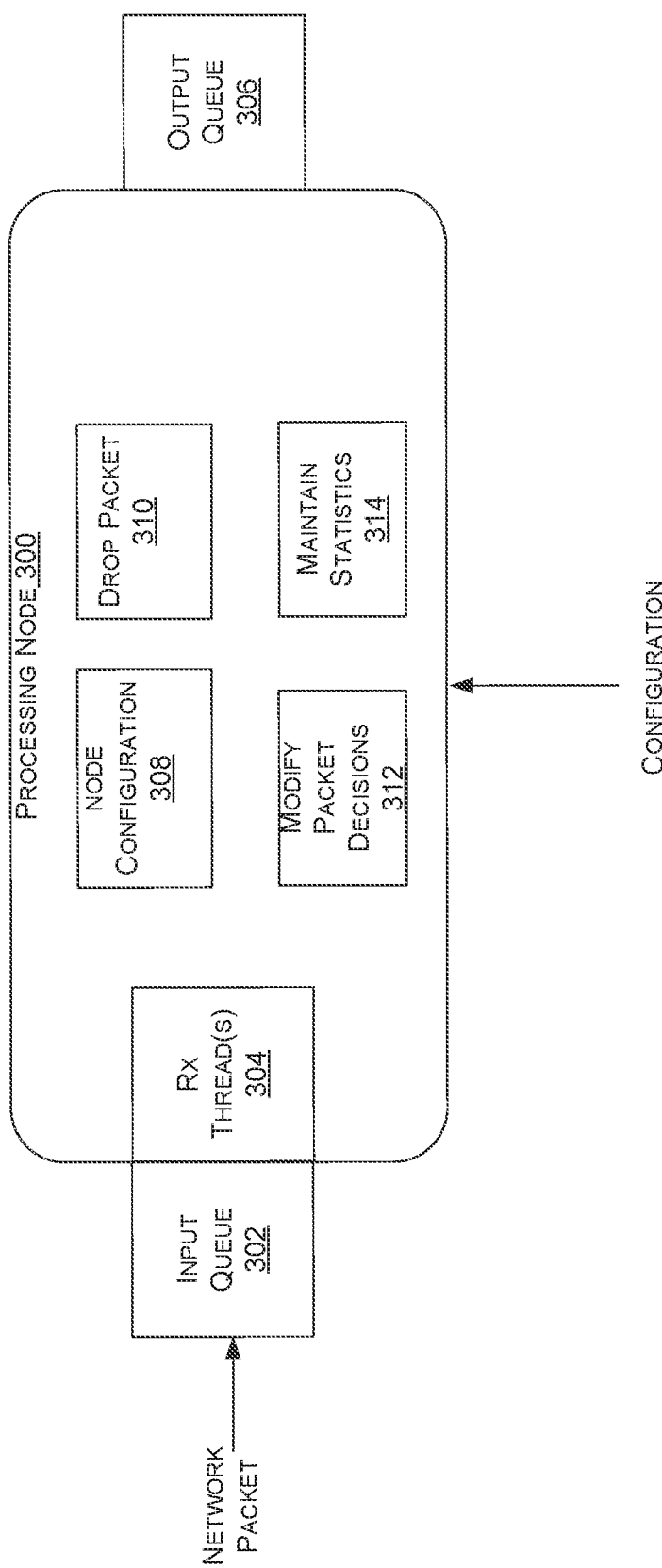
FIG. 3 illustrates an example processing node, according to certain embodiments.

FIG. 3 illustrates an example processing node, according to certain embodiments. In certain embodiments, each of the functional components of FIG. 1 may be implemented as a processing node 300, as illustrated in FIG. 3. A processing node 300 may be executed using a software thread on a logical core. As described above with reference to FIG. 2, the processing node allocator module 236 may configure a processing node 300 with certain functionality, allocate a real-time thread for executing the processing node 300 and set the affinity for the processing node 300 to a particular logical core. In certain embodiments, the processing framework 202 may further allow configuration of the processing node via configuration information after the initialization and addition of the processing node 300 to the pool of processing nodes 204.

In certain implementations, a processing node 300 may receive a network packet as an input at an input queue 302 and store the network packet locally. In certain implementations, the input queue 302 may be a multi-producer single consumer queue. In other words, the input queue 302 may be configured to queue up several network packets from several sources for processing by the processing node 300. In certain embodiments, the input queue 302 may store only the header for the network packet or a pointer to the network packet. Once the processing node 300 is available for processing a network packet, the processing node 300 receives the packet at the Rx thread 304 for processing of the network packet.

The processing node 300 executing using a software thread may be configured to perform a number of base operations. For example, as illustrated in FIG. 3, the node configuration module 308 may modify the functioning of the processing node based on the configuration data. In certain embodiments, the processing of the network packet or configuration changes from the processing framework 202 may cause the processing node 300 to change the packet arc for the network packet through the network device. For instance, the node configuration module 308 may modify the persistent data attached to the network packet that indicates the packet arc to disable processing by certain processing nodes or add processing by certain other processing nodes.

Modify packet decisions module 312 may modify the processing of the network packet based on certain conditions detected at the processing module. In certain embodiments, these conditions may be configured by the processing framework 202. For example, the processing framework 202 may request logging of all network packets that are processed and marked for dropping, for further analysis. Drop packet module 310 may drop packets when certain conditions are met. For example, the processing framework 202 may monitor the health of the network and determine congestion and request dropping of certain packets by the processing node 300. In yet other instances, the processing framework 202 may determine an attack from a specific source address and may request the processing framework 202 to drop any packets with that specific source address.

Maintain statistics module 314 may be configured to maintain and provide certain information regarding the state of the processing node 300 and the processing of the network packets by the processing node 300 to the statistics module 238 of the processing framework 202. As discussed previously, the current statistics provided by the statistics module 238 may alter the behavior of the future processing of network packets. For example, a number of processing nodes for performing a specific network function may be increased based on the state of the input queue 302 of the processing node 300. Examples of statistics information may include, but are not limited to, a count of network packets processed by the processing node 300, a count of the number of the packets dropped, a number of bytes processed, state of the input and output queues, etc.

After processing of the network packet by the current processing node 300, the network packet may get scheduled for processing by the next processing node in the packet arc for the network packet. The network packet is queued in the output queue 306 until the network packet can be dispatched to the next processing node. A full output queue 306 may also indicate a bottleneck. In certain implementations, a full output queue or an output queue with network packets beyond a threshold may indicate to the input queue 302 to stop or slow down accepting of additional network packets for processing. In certain instances, the processing node 300 may also inform the processing framework 202 of the congestion being experienced at the processing node 300.

Figure 4:
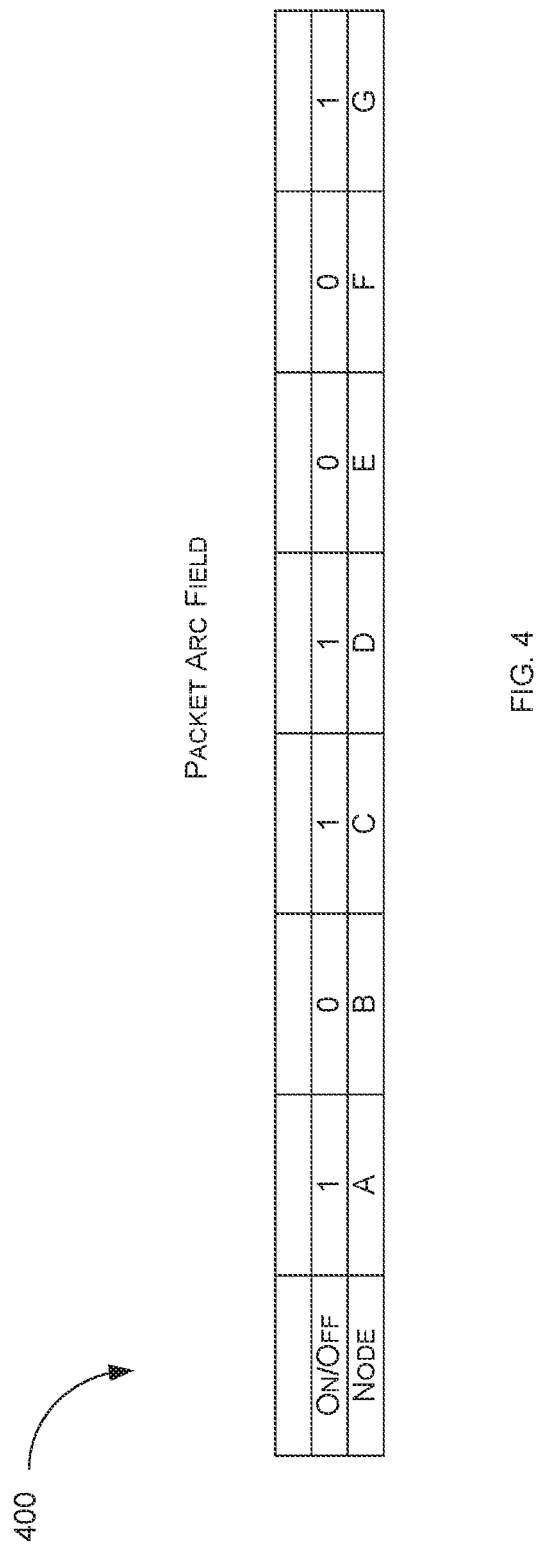
FIG. 4 illustrates an example bit field for a packet arc, that is associated with a network packet.

FIG. 4 illustrates an example packet arc field, that is associated with a network packet. Packet arc field 400 is merely an example and is not limiting as to the implementation, in the number of packet arcs or the number of processing nodes. A processing node is selected by using a bit in the bit field that indicates by "1" that the corresponding processing node is selected and by "0" that the corresponding processing node is not selected. In certain instances, the bit field may also be referred to as a bit mask, that uses zeros to mask off processing nodes. The packet arc field 500 for the network packet indicates that the packet arc for the network packet and includes nodes A, C, D, and G (marked by "1"). Nodes B, E and F are not part of the packet arc for the network packet and are skipped as part of the dynamic network processing pipeline for the network packet. In certain implementations, the bit field for the packet arc may be associated or attached with the network packet as persistent data for selecting the corresponding processing nodes as the network packet traverses the network pipeline. This technique allows for a dynamic and customizable pipeline for different network packets and consequently different network flows.

The configurable packet arc field 400 allows a dynamic and flexible packet processing pipeline that can be custom tailored to the specific network traffic and that springs to existence upon arrival of the network packet. Once the network packet is processed, the same processing nodes are seamlessly reallocated for processing other network packets received on the same or different network interfaces with the same or different packet arcs.

Figure 5:
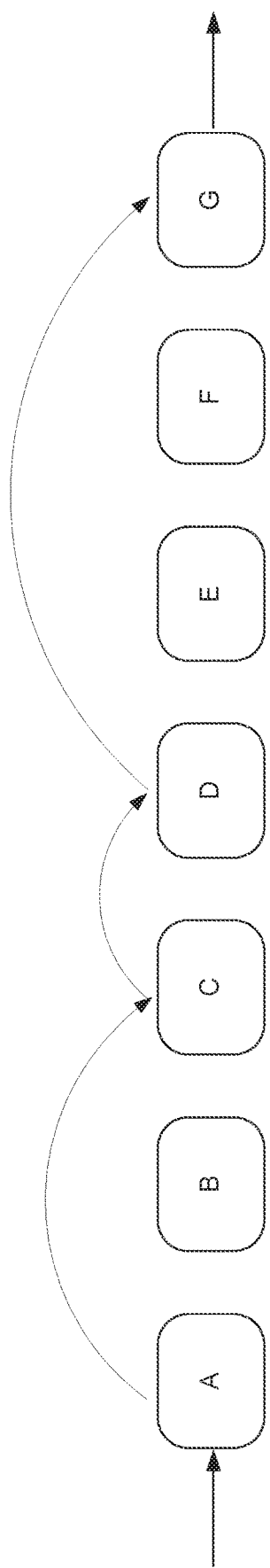
FIG. 5 is a visual illustration of the selected processing nodes using the bit field for the packet arc of FIG. 4.

FIG. 5 is a visual illustration of the selected processing nodes using the bit field for the packet arc of FIG. 4. FIG. 5 illustrates the path of the network packet through the processing nodes for the packet arc for the network packet, where the network packet is scheduled to traverse processing nodes A, C, D, and G and skip nodes B, E, and F. As previously discussed, selecting the processing nodes for a network packet allows for a dynamic and customizable packet processing pipeline.

In certain embodiments, the processing nodes for processing the same network packet may maintain flow affinity to the same logical core across processing of the network packet using different processing nodes. For example, the next processing node in the sequence of processing nodes for a packet arc may be scheduled to execute on the same processing entity as the current processing node. Executing multiple processing nodes associated with the processing of the same network packet on the same processing entity may reduce latency and resources associated with moving the network packet to another logical core. Processing multiple packets within a single processing node allows for cache performance efficiencies. For instance, multiple processing nodes may be able to use the network packet already in the logical core cache, instead of copying the network packet from one logical core to another. Also, similarly large data structures, such as forwarding tables may be more efficiently used by multiple processing nodes on the same logical core.

In certain implementations, thread affinity for certain processing nodes may be configured by the processing framework 202 prior to receiving network packets for forwarding. In other implementations, thread affinity associated with multiple processing nodes for a packet arc may be implemented using an exception table, wherein before forwarding a network packet for processing to the next processing node, the processing node may determine if an exception is indicated for processing the packet by a processing node with affinity for a specific logical core. Based on a match in the exception table a corresponding processing node with affinity to a certain logical core may be selected for processing of the network packet.

Figure 6:
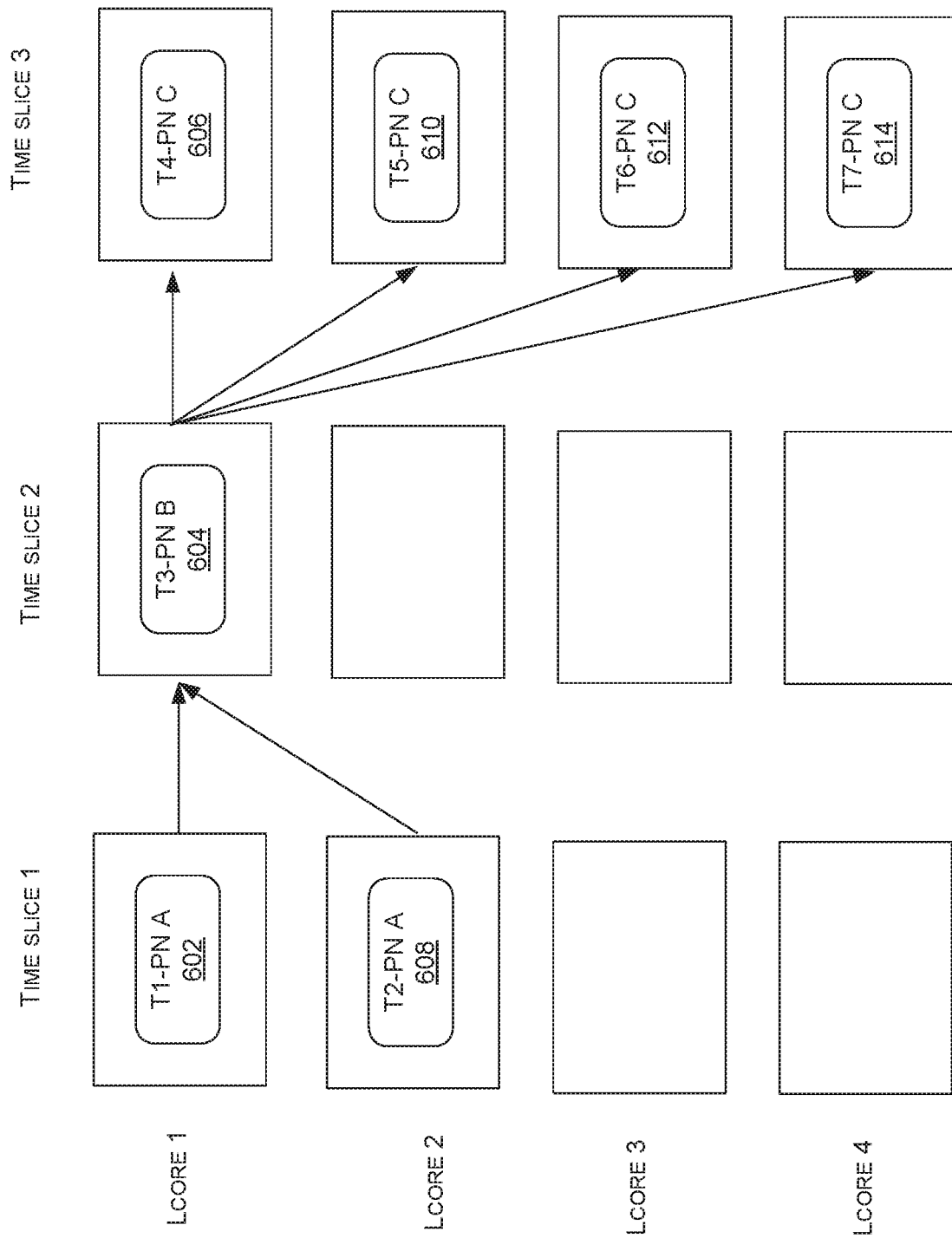
FIG. 6 is a block diagram illustrating scheduling of logical cores for executing processing nodes, according to certain aspects of the invention.

FIG. 6 is a block diagram illustrating scheduling of the logical cores for executing processing nodes, according to certain aspects of the invention. In FIG. 6, lcore refers to a logical core. As discussed previously, a logical core may be a logical representation of a processor. FIG. 6 visually represents four lcores over three sequential periods of time (i.e., time slice 1, time slice 2 and time slice 3). The processing time is timeshared on lcore 1 for processing nodes A, B and C and so on and so forth. Therefore, on lcore 1, threads T1 (602), T3 (604) and T4 (606) are running cooperatively. As illustrated in FIG. 6, lcore 2 is only timeshared between processing nodes A and C and lcore 3 and lcore 4 are only executing processing node C.

In certain embodiments, the architecture described herein allows for a configurable amount of resources for the processing associated with a processing node. As illustrated in FIG. 6, T1 (602) executing on lcore 1 and T2 (608) executing on lcore 2 may both execute instructions associated with processing node A for processing network packets. Similarly, T4 (606) executing on lcore 1, T5 (610) executing on lcore 2, T6 (612) executing on lcore 3 and T7 (614) executing on lcore 4 may all execute instructions associated with processing node C. T2 (604) executing on lcore 1 is the only software thread executing instructions associated with processing node B. As seen in FIG. 6, processing node C has many more lcores assigned for processing network packets than the other processing nodes illustrated in FIG. 6 and even has a few dedicated lcores (lcore 3 and lcore 4) for executing instructions for processing node C. In certain embodiments, processing node C may be associated with a more processing intensive networking operation, such as route lookup. On the other hand, only one software thread executing on lcore 1 is assigned for processing node B. In certain implementations, processing node B may be associated with a relatively light weight operation such as incrementing the time to live (TTL) counter or checking a certain header field.

The above architecture allows for allocation of resources to different functional components based on the processing needs for those components. In certain examples, if the input queues of the processing node B executing on software thread T2 (604) on lcore 1 starts clogging or filling up beyond a threshold, the processing framework 202 may detect such a condition through the statistics information (via statistics module 238 of FIG. 2 and maintain statistics module 314 of FIG. 3). In such a scenario, since processing node B may create a bottleneck for the processing node C, the processing framework 202 may reallocate and/or timeshare one of the lcores dedicated to processing node C, such as lcore 3 or lcore 4, for processing node B to alleviate the congestion in the network pipelines.

FIG. 6 may also illustrates the affinity for processing a network packet using the same logical core. For example, lcore 1 is always utilized for the processing of the processing nodes. For each time slice, lcore 1 is always used for the processing of the network packet. Setting the affinity for the processing node to specific threads allows for large structures and large sets of data, such as the firewall tables and network packets, to stay resident with one lcore instead of spreading across different lcores and may improve performance.

Although, in certain embodiments packets may also traverse to different lcores during processing. In other words, the system doesn't ensure that a packet isn't affinitized to the same lcore during its processing life-cycle For example, a single packet may be processed on lcore 2, then moved to lcore 1 and finally lcore 4 (according to FIG. 6). In certain embodiments, physical core affinity on multiple physical processor system (i.e., a dual CPU or quad CPU system) may be ensured in certain instances, so that the processing of the network packet may be formed on a single physical processor.

In certain embodiments, processing flow affinity may be designed into the implementation. In other words, the network flows may be always assigned to the same deterministic processing node and software thread for processing. For example, the affinity for processing nodes on specific lcores may be set not only for a network packet, but for a flow of network packets or network flow. A network flow may refer to a stream of network packets generally originating from the same source and destined for the same destination. In certain embodiments, the network packets belonging to the same network flow may also include similar data or network traffic (e.g., streaming video). In certain embodiments, the system may hash certain header fields to determine that the network packet belongs to a certain network flow and schedule the network packets associated with the network flow using the same processing nodes on the same lcores by using the same software threads. This allows for additional latency benefits, since network packets belonging to the same flow may need the same data structures, such as route lookup tables to perform different networking operations. Restricting the network packets belonging to the same network flow to follow the same processing nodes being executed on the same lcores also ensures that the network packets belonging to the same network flow are executed in sequence and do not end up at the destination out of order (that requires significant additional steps of resembling the network packets from the out-of-order sequence).

In certain embodiments, executing multiple sequential processing nodes on a single logical core for processing of a network packet may enable more efficient use of system resources. For example, a logical core may have certain cache and other hardware resources dedicated to the logical core. Executing multiple sequential processing nodes on a single logical core may utilize the cache and other hardware resources associated with the logical core more effectively. For example, a network packet being processed by several processing nodes using the same logical core can use the network packet and its associated metadata from the caches, reducing the copying of the packet from one logical core to another and increasing performance.

Although, the above description discusses processing nodes executing on logical cores associated with a physical processor, in certain embodiments, one or more processing nodes may be executed on a separate physical processor or altogether a separate system. In yet other embodiments, the logical core may execute as a virtual machine. In this way this design supports a separation of hardware resources/design at the processing node level, i.e. multiple hardware architectures can be supported within the context of this single packet processing pipeline.

Figure 7:
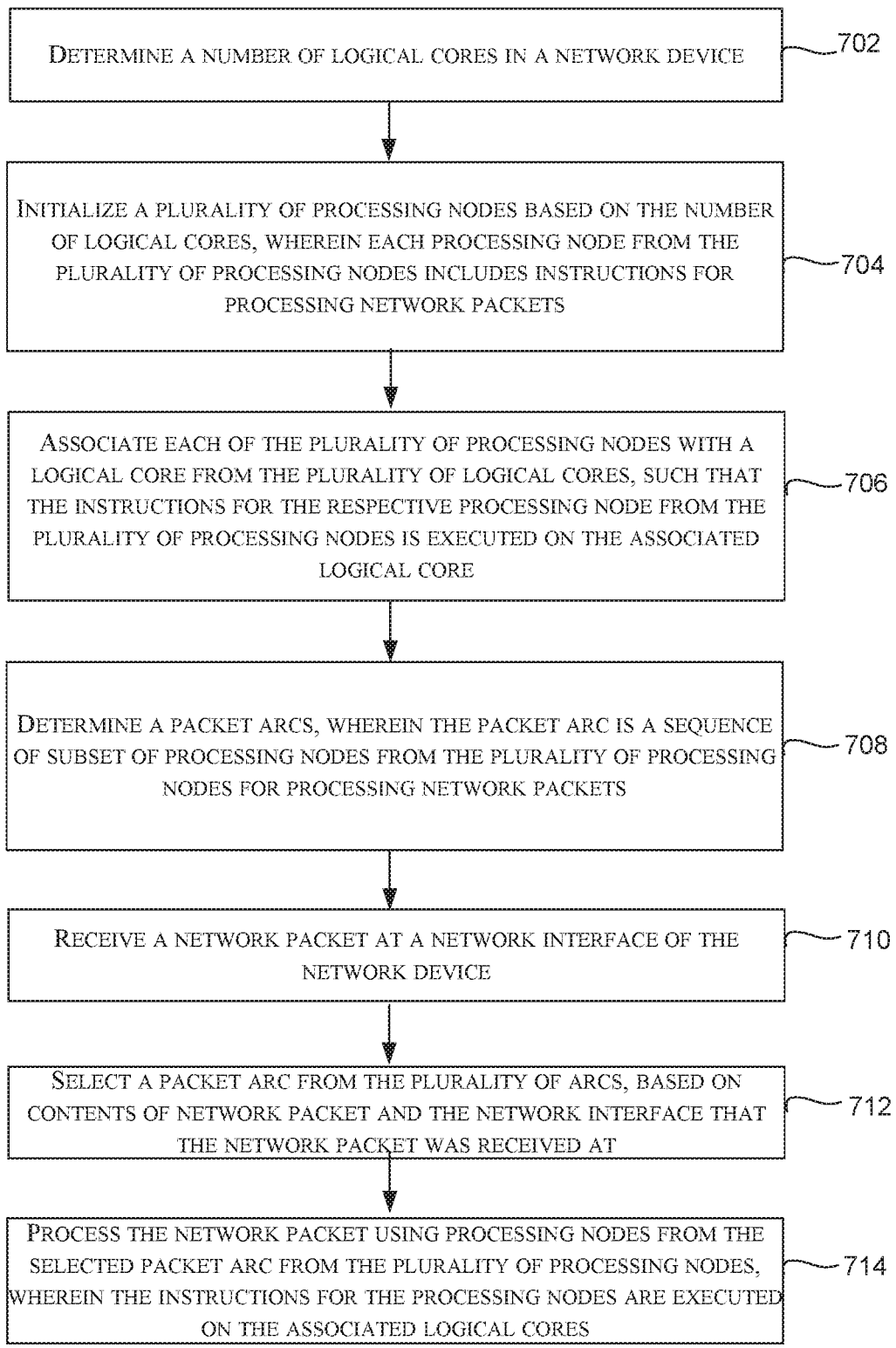
FIG. 7 is a flow diagram illustrating a method 700 for performing embodiments of the invention according to one or more illustrative aspects of the disclosure.

FIG. 7 is a flow diagram illustrating a method 700 for performing embodiments of the invention according to one or more illustrative aspects of the disclosure. According to one or more aspects, any and/or all of the methods and/or method steps described herein may be implemented by and/or in a network device 200, or computer system 1600.

In one embodiment, one or more of the method steps described below with respect to FIG. 7 are implemented by one or more processors of a computing system 1600, such as the processors 1610 or another processor. Additionally or alternatively, any and/or all of the methods and/or method steps described herein may be implemented in computer-readable instructions, such as computer-readable instructions stored on a computer-readable medium such as the memory 1635, storage 1625 or another computer-readable medium.

At block 702, components of the network device, such as the logical core determination module 224, may determine a number of logical cores in the network device. In certain embodiments, the logical core determination module 224 may call operating system APIs to determine the number of logical cores (or available logical cores) on the network device. Logical cores may refer to the number of logical processing entities exposed to the software layer. In one implementation, several logical cores may be supported by a single physical core and several physical cores may reside on a physical processor.

At block 704, components of the network device, such as the processing node allocator module 236, may initialize a plurality of processing nodes based on the number of logical cores. Each processing node from the plurality of processing nodes may include instructions for processing network packets. Furthermore, each processing node may include an input queue for receiving network packets from a previous processing node and an output queue for sending network packets to its next processing destination.

In certain embodiments, processing network packets may refer to performing one or more operations on the network packet for forwarding the network packet to the next hop. In certain embodiments, processing the network packets may include inspecting headers, performing firewall operations, performing route lookup, performing forwarding lookup, incrementing time to live values, performing access control operations, performing tunneling, etc.

At block 706, components of the network device, such as the processing node allocator module 236, may associate each of the plurality of processing nodes with a logical core from the plurality of logical cores, such that the instructions for a processing node from the plurality of processing nodes are executed on an associated logical core with the processing node. In certain embodiments, each of the plurality of the processing nodes executes using a software thread and each of the software threads is associated with the logical core by setting the affinity of the software thread to the respective logical core.

At block 708, components of the network device, such as the packet arc determination module 226, may determine a packet arc, wherein the packet arc may be a sequence of subset of processing nodes from the plurality of processing nodes for processing network packets. The subset of processing nodes may be less than the plurality of processing nodes. In certain embodiments, the packet arc determination module 226 may receive instructions from a network control plane interface for assigning processing nodes to the various packet arcs.

At block 710, components of the network device, such as a network interface 208, may receive a network packet. At block 712, a packet filter module 210 and/or an arc scheduler module 214 may select a packet arc, based on contents of the network packet and/or the network interface that the network packet was received at.

At block 714, the network device may process the network packet using processing nodes from the selected packet arc. The instructions for the processing nodes may be executed on the logical cores associated with the processing nodes at block 706. In certain embodiments, one of the processing nodes may change the path determined by the packet arc based on the processing of the network packet. In yet another embodiment, a processing node may change a sequence of the processing to be performed by the set of processing nodes on the network packet.

In certain embodiments, the processing framework 202 may add, replace, or remove processing nodes from one or more packet arcs. In certain embodiment, the processing framework 202 may add a new processing node to the plurality of processing nodes and packet arc, by redirecting output of the processing node before the position at which the new processing node is to be inserted. In addition, the output of the new processing node may be directed to the output of the processing node that is being moved up in the packet arc.

In certain embodiments, components of the network device, such as the statistics module 238, may be configured to collect statistics based on processing of the network packet. In certain instances, the statistics module 238 may cause changes to the processing nodes and the logical cores scheduled for processing network packets based on the collected statistics from one or more processing nodes.

It should be appreciated that the specific steps illustrated in FIG. 7 provide a particular method of switching between modes of operation, according to an embodiment of the present invention. Other sequences of steps may also be performed accordingly in alternative embodiments. For example, alternative embodiments of the present invention may perform the steps outlined above in a different order. Furthermore, additional steps or variations to the steps may be added or removed depending on the particular applications. One of ordinary skill in the art would recognize and appreciate many variations, modifications, and alternatives of the process.

FIG. 8 illustrates an example processing node definition, according to certain embodiments of the invention. This procedure indicates that a new node is being added. The packet arc is dynamic also in the sense that it allows new processing nodes to be added and previously present processing nodes to be removed and/or replaced. The function disclosed in FIG. 8 starts with a function that enumerates the different dispositions using an enum process for the different outcomes, such as ACCEPT the network packet for further forwarding, IPV6 translation or dropping the packet. The example code disclosed in FIG. 8 may be an example of firewall code. The firewall processing node can cause the packet to go to the next processing node after being accepted (i.e., IPV4_FW_ACCEPT), provide a network address translation from IPV4 to IPV6 (i.e., IPV4_FW_TO_V6) or drop the packet altogether (i.e., IPV4_FW_DROP).

The next function (PL_REGISTER_NODE) illustrates defining and registering the processing node with the system. The registered processing node is configured to forward the network packet to one or more of three processing nodes.

FIG. 9 illustrates a packet arc that can be dynamically updated with an unreferenced processing node, according to certain embodiments. In certain embodiments, an unreferenced node may refer to a new processing node. The unreferenced node (e.g., sample in FIG. 9) is added to the packet arc based on the context. For example, in FIG. 9, sample processing node is provided as an output for ip4-rtl and has the output as packet-out. The registration of the node with the processing framework places the packet in the appropriate sequence in the packet arc as shown in FIG. 9

(where the packet arc on the left side of the arrow is before the sample processing node is added, and the packet arc on the right side of the arrow illustrates the node processing arc after the registration of the sample processing arc).

The above technique allows a third party developer to insert a processing node in the packet arc without knowing all the referenced nodes and without directly being referenced by any of the pre-existing processing nodes, just by providing the placement location of the processing node (i.e., what processing node comes before and what processing node comes after the processing node to be inserted). Furthermore, in certain embodiments, just providing the next processing node that the network packet should be passed to in the packet arc may be sufficient for the placement of the new processing node in the packet arc. For example, registering the new sample processing node, such that the output of the new sample processing node is always "packet-out" would place the new sample processing node before each instance of the "packet-out" processing node. In certain embodiments, the new sample processing node may be added without even recompiling the network device code, by just adding a new executable that registers the processing node with the processing framework (e.g., processing framework 202 of FIG. 2) that performs the modifications to the packet arc. The processing framework inserts the new sample processing node into the packet arc.

FIG. 10 illustrates example code for providing persistent packet storage, according to certain embodiments. In certain embodiments, the network packet may traverse through different processing nodes for a given node processing arc with persistent state (e.g., metadata) that allows for more efficient processing of the network packet. The data is persistent with the network packet. This code snippet defines a data storage area in the network packet that can be written to, read from the network packet. Any processing node can access this persistent data. The pl_get_node_data function allows reading of the state of the processing node, whereas the pl_set_node_data allows for setting of the processing node data.

FIG. 11 illustrates example code for node command registration, according to certain embodiments. For example, the processing framework may direct commands to the processing nodes. In certain embodiments, the commands may manifest from the control plane. In certain embodiments, the commands may be directed from the controller or the control plane that are initiated using a command line interface (e.g., CLI) or other interface (as shown in FIG. 12). The command may be targeted to specific types of processing nodes. For example, the command may target a specific type of firewall processing node and direct it to drop packets with a particular source or destination IP address. This technique allows for dynamic configuration of nodes from the control plane through the processing framework.

FIG. 12 illustrates example code for CLI node configuration. For example, based on a match specified by the CLI, the processing framework may disable certain processing nodes completely.

FIG. 13 illustrates example code for a processing node, such as a firewall, according to certain embodiments.

FIG. 14 illustrates example statistics associated with a processing node, according to certain embodiments. Certain commands from the controller directed to the processing node may be used to instruct the processing nodes to collect and store certain types of statistics. Aspects disclosed herein allow statistics to be collected at a processing node granularity. As previously discussed, such statistics may be used to determine the usage of resources in the system, identify congestion and reallocate resources by the processing framework to increase efficient use of resources and robustness of the network device.

FIG. 15 illustrates example processing node trace capabilities, according to certain embodiments. In certain embodiments, the trace allows the developers, debuggers, or IT staff to root-cause performance or failures associated with the processing of the network packets at a processing node granularity.

In certain embodiments, the system also supports original process-to-completion design (as shown in FIG. 1) with same performance characteristics. This allows delivering a stripped down low-overhead implementation of a lower-powered system on chip configuration possibly.

Figure 16:
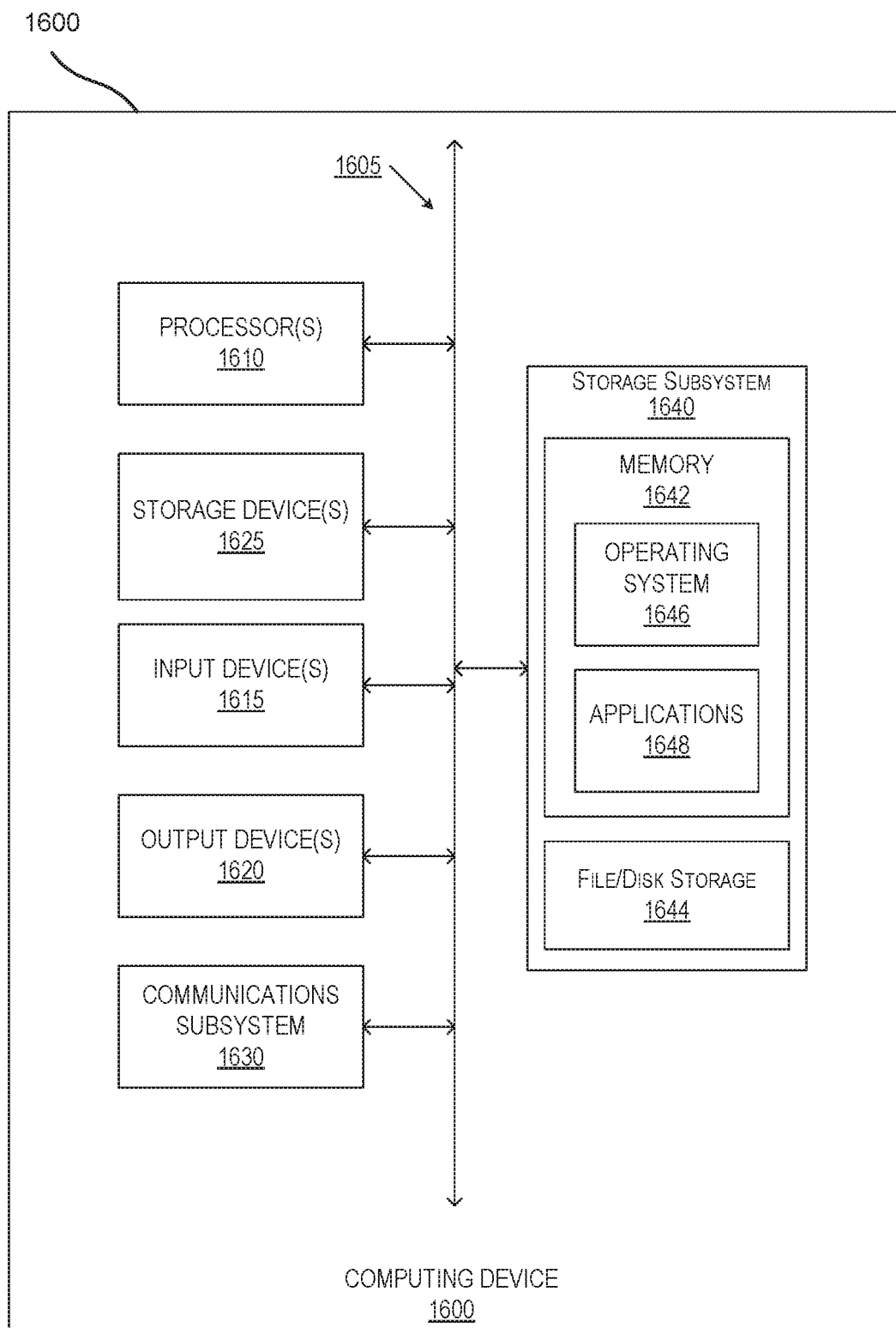
FIG. 16 is a simplified block diagram of a computing system or device that may be used to execute various components of a network device according to one or more aspects.

FIG. 16 is a simplified block diagram of a computing system or device 1600 that may be used to execute various components or subsystems of a router according to an embodiment of the present invention. In some embodiments, computing system 1600 is configured to implement any of the methods described above. For example, one or more computer systems like computer system 1600 may be used to execute a data plane networking pipeline or processing nodes associated with such a network pipeline.

Computer system 1600 can be of various types including, without limitation, a personal computer, a portable computer, a workstation, a network computer, a mainframe, a kiosk, a PDA, a cell phone, or any other data processing system. Due to the ever-changing nature of computers and networks, the description of computer system 1600 depicted in FIG. 16 is intended only as a specific example for purposes of illustrating the preferred embodiment of the computer system. Many other configurations having more or fewer components than the system depicted in FIG. 16 are possible.

Computer system 1600 is shown comprising hardware elements that can be electrically coupled via a bus 1605. The hardware elements may include one or more processors 1610, one or more input devices 1615, one or more output devices 1620, a communications subsystem 1630, and a storage subsystem 1640. Bus subsystem 1605 provides a mechanism for letting the various components and subsystems of computer system 1600 communicate with each other as intended. Although bus subsystem 1605 is shown schematically as a single bus, alternative embodiments of the bus subsystem may utilize multiple busses.

Processors 1610 represent the processing resources of computer system 1600 and may include without limitation one or more general-purpose processors and/or one or more special-purpose processors (such as digital signal processing chips, graphics acceleration processors, and/or the like). Processors 1610 may include one or more multicore processors.

Input devices 1615 may include one or more different mechanisms for providing inputs to computer system 1600 such as, without limitation, a mouse, a keyboard, a touchpad, a tablet, and/or the like. Output devices 1620 may include one or more different mechanisms for outputting information from computer system 1600 such as, without limitation, a display unit, a printer, and/or the like.

Computer system 1600 may also include a communications subsystem 1630, which facilitates communications to and from computer system 1600. Communications subsystem 1630 can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. Communications subsystem 1630 may permit data to be exchanged with a network, other computer systems, and/or any other devices described herein. In certain embodiments, communications subsystem 1630 may include forwarding hardware that is used to implement a hardware data plane according to the teachings above.

Storage subsystem 1640 provides a non-transitory medium for storing information and code (instructions) that can be executed by one or more processors 1610. For example, storage subsystem 1640 may be configured to store the basic programming and data constructs that provide the functionality of embodiments of the present invention. According to an embodiment of the present invention, software code instructions or modules implementing the functionality of the present invention may be stored in storage subsystem 1640. These software modules may be executed by processor(s) 1610. Storage subsystem 1640 may also provide a repository for storing data used in accordance with the present invention. Storage subsystem 1640 may comprise a memory subsystem 1642 and a file/disk storage subsystem 1644.

Memory subsystem 1642 may include a number of memories such as a main random access memory (RAM) for storage of instructions and data during program execution, a read only memory (ROM) in which fixed instructions are stored, flash memory, and the like. Various software elements may be located within system memory 1642 such as an operating system 1646, device drivers, executable libraries, and/or other code, such as one or more application programs 1648, which may comprise computer programs provided by various embodiments, and/or may be designed to implement methods, and/or configure systems, provided by other embodiments, as described herein.

File storage subsystem 1644 provides persistent (non-volatile) storage for program and data files, and may include a hard disk drive, a floppy disk drive along with associated removable media, a Compact Disk Read Only Memory (CD-ROM) drive, an optical drive, removable media cartridges, local and/or network accessible storage, and other like storage media.

The terms "machine-readable medium" and "computer-readable medium," as used herein, refer to any non-transitory medium that participates in providing data that causes a machine to operate in a specific fashion. In an embodiment implemented using the computer system 1600, various computer-readable media might be involved in providing instructions/code to processor(s) 1610 for execution and/or might be used to store such instructions/code. Computer-readable medium may take many forms such as non-volatile media and volatile media.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Features described with respect to certain embodiments may be combined in various other embodiments. Different aspects and elements of the embodiments may be combined in a similar manner. Technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although certain embodiments have been described using a particular series of transactions and steps, it should be apparent to those skilled in the art that the scope of the present invention is not limited to the described series of transactions and steps. Although some flowcharts describe operations as a sequential process, many of the operations can be performed in parallel or concurrently. In addition, the order of the operations may be rearranged. A process may have additional steps not included in the figure.

Further, while certain embodiments have been described using a particular combination of hardware and software, it should be recognized that other combinations of hardware and software are also within the scope of the present invention. Certain embodiments of the present invention may be implemented only in hardware, or only in software (e.g., code programs, firmware, middleware, microcode, etc.), or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation such as by executing computer instructions or code, or any combination thereof. Processes can communicate using a variety of techniques including, but not limited to, conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A network device for forwarding network packets, comprising:
    a first network interface and a second network interface for receiving network packets;
    a physical processor comprising a first logical core, a second logical core, a third logical core, and a fourth logical core; and a non-transitory computer readable medium comprising instructions executable by the physical processor for performing operations comprising:
  scheduling the first logical core to execute a first group of instructions for processing network packets, the second logical core to execute a second group of instructions for processing network packets, the third logical core to execute a third group of instructions for processing network packets, and the fourth logical core to execute a fourth group of instructions for processing network packets;
  responsive to receiving a first network packet at the first network interface, selecting, based on an identification of first contents of the first network packet, the identification of the first contents including an identification of a first source address, a first packet arc indicating a first sequence of execution, the first sequence of execution comprising an execution via the first group of instructions followed by an execution via the second group of instructions;
  processing the first network packet according to the first packet arc by executing, on the first logical core, the first group of instructions followed by executing, on the second logical core, the second group of instructions;
  responsive to receiving a second network packet at the second network interface, selecting, based on an identification of second contents of the second network packet, the identification of the second contents including an identification of a second source address, a second packet arc indicating a second sequence of execution, the second sequence of execution comprising an execution via the second group of instructions followed by an execution via the third group of instructions;
  processing the second network packet according to the second packet arc by executing, on the second logical core, the second group of instructions followed by executing, on the third logical core, the third group of instructions;
  responsive to receiving a third network packet at the first network interface, selecting, based on an identification of third contents of the third network packet, the identification of the third contents including an identification of a third source address that is different from the first source address, a third packet arc indicating a third sequence of execution, the third sequence of execution comprising an execution via the first group of instructions, followed by an execution via the fourth group of instructions, followed by an execution via the second group of instructions; and
  processing the third network packet according to the third packet arc by executing, on the first logical core, the first group of instructions followed by executing, on the fourth logical core, the fourth group of instructions followed by executing, on the second logical core, the second group of instructions.

2. The network device of claim 1, wherein the operations further comprise:
  initializing a plurality of software threads;
  scheduling the first group of instructions and the second group of instructions for execution using one of the plurality of software threads; and
  associating each software thread of the plurality of software threads with a logical core by setting affinity of the software thread to the logical core.

3. The network device of claim 1, wherein the selecting of the first packet arc is based on information received from a network control plane and the selecting of the second packet arc is based on the information received from the network control plane.

4. The network device of claim 1, the operations further comprising:
  directing an output of the first group of instructions to the third group of instructions; the network device further comprising:
  a processing framework configured to enable the third group of instructions to be included in the first packet arc, wherein the output of the first group of instructions is redirected to the third group of instructions and an output of the third group of instructions is directed to the second group of instructions.

5. The network device of claim 1, wherein the first group of instructions is configured to collect statistics based on processing of the first network packet, the operations further comprising:
  updating the first packet arc with an additional sequence based on the statistics; and
  rescheduling the first group of instructions and the second group of instructions according to the updated first packet arc.

6. The network device of claim 1, wherein the operations further comprise:
  processing the first network packet using fifth group of instructions concurrently on a plurality of logical cores.

7. The network device of claim 1, wherein the first group of instructions and the second group of instructions each comprises:
  an input queue for receiving the first network packet for processing; and
  an output queue for outputting the first network packet after processing.

8. The network device of claim 1, wherein the operations further comprise:
  responsive to receiving a fourth network packet at the first network interface, selecting, based on contents of the fourth network packet, a fourth packet arc identifying an additional sequence of instructions; and
  scheduling processing of the fourth network packet by scheduling, according to the fourth packet arc, execution of the additional sequence of instructions.

9. The network device of claim 8, wherein the first packet arc and the fourth packet arc are executed in parallel.

10. The network device of claim 1, wherein the operations further comprise:
  responsive to analyzing contents of the first network packet, reallocating the first network packet to the second packet arc.

11. The network device of claim 1, wherein the operations further comprise:
  scheduling the second logical core to execute the first group of instructions;
  responsive to receiving a fourth network packet at the first network interface, selecting, based on an analysis of fourth contents of the fourth network packet, a fourth packet arc indicating a fourth sequence of groups of instructions, the fourth sequence comprising the second group of instructions followed by the first group of instructions; and
  processing the fourth network packet according to the fourth packet arc.

12. The network device of claim 1, wherein the first group of instructions is implemented by a first thread, the second group of instructions by a second thread, and the third group of instructions by a third thread.

13. The network device of claim 1, wherein the fourth group of instructions corresponds to an application of a firewall function.

14. A method for forwarding network packets, comprising:
- determining a number of logical cores in a network device, wherein a physical core comprises the logical cores;
- associating a first logical core of the logical cores with a first group of instructions, a second logical core of the logical cores with a second group of instructions, and a third logical core of the logical cores with a third group of instructions;
- responsive to receiving a first network packet at a first network interface of the network device, identifying a first source address associated with the first network packet;
- selecting a first packet arc based on the identifying of the first source address;
- responsive to receiving a second network packet at a second network interface of the network device, selecting a second packet arc based on contents of the second network packet;
- responsive to receiving a third network packet at the first network interface, identifying a second source address associated with the third network packet, wherein the second source address is different from the first source address;
- selecting a third packet arc based on the identifying of the second source address; and
- scheduling processing of the first network packet according to the first packet arc, the second network packet according to the second packet arc, and the third network packet according to the third packet arc, wherein the scheduling of the processing causes the first network packet to be processed by the first group of instructions on the first logical core followed by the second group of instructions on the second logical core, wherein the scheduling of the processing causes the second network packet to be processed by the first group of instructions on the first logical core followed by the third group of instructions on the third logical core, and wherein the scheduling of the processing causes the third network packet to be processed by the second group of instructions on the second logical core followed by the third group of instructions on the third logical core.

15. The method of claim 14, wherein the first group of instructions is executed using a first software thread and the second group of instructions is executed using a second software thread.

16. The method of claim 14, further comprising:
- determining statistics based on processing of the first network packet; and
- updating the first packet arc with an additional group of instructions based on the statistics.

17. The method of claim 14, wherein the first group of instructions, the second group of instructions, and the third group of instructions each comprises an input queue for receiving a network packet for processing and an output queue for outputting a network packet after processing of the network packet received on the respective input queue.

18. The method of claim 14, wherein the first group of instructions corresponds to an application of a firewall function.

19. A non-transitory computer-readable storage medium including machine-readable instructions stored thereon for:
- executing a first group of instructions, a second group of instructions, and a third group of instructions;
- associating a first logical core to execute the first group of instructions, a second logical core to execute the second group of instructions, and a third logical core to execute the third group of instructions;
- responsive to receiving a first network packet at a first network interface, identifying a first source address associated with the first network packet;
- selecting a first packet arc based on the identifying of the first source address, wherein the first packet arc indicates a first network path for the first network packet;
- processing the first network packet according to the first packet arc by executing instructions for the first group of instructions on the first logical core and instructions for the second group of instructions on the second logical core;
- responsive to receiving a second network packet at a second network interface, selecting, based upon second content from the second network packet, a second packet arc indicating a second sequence comprising the second group of instructions and the third group of instructions, wherein the second packet arc indicates a second network path for the second network packet;
- processing the second network packet according to the second packet arc by executing instructions for the second group of instructions on the second logical core and instructions for the third group of instructions on the third logical core;
- responsive to receiving a third network packet at the first network interface, identifying a second source address associated with the third network packet;
- selecting a third packet arc based on the identifying of the second source address, wherein the third packet arc indicates a third network path for the third network packet; and
- processing the third network packet according to the third packet arc by executing instructions for the second group of instructions on the second logical core and instructions for the third group of instructions on the third logical core.

20. The non-transitory computer-readable storage medium of claim 19, wherein the first group of instructions corresponds to an application of a firewall function.

* * * * *